March 31, 1964  A. TEMPE  3,127,002
TRANSFER DEVICE
Original Filed July 6, 1959  3 Sheets-Sheet 1
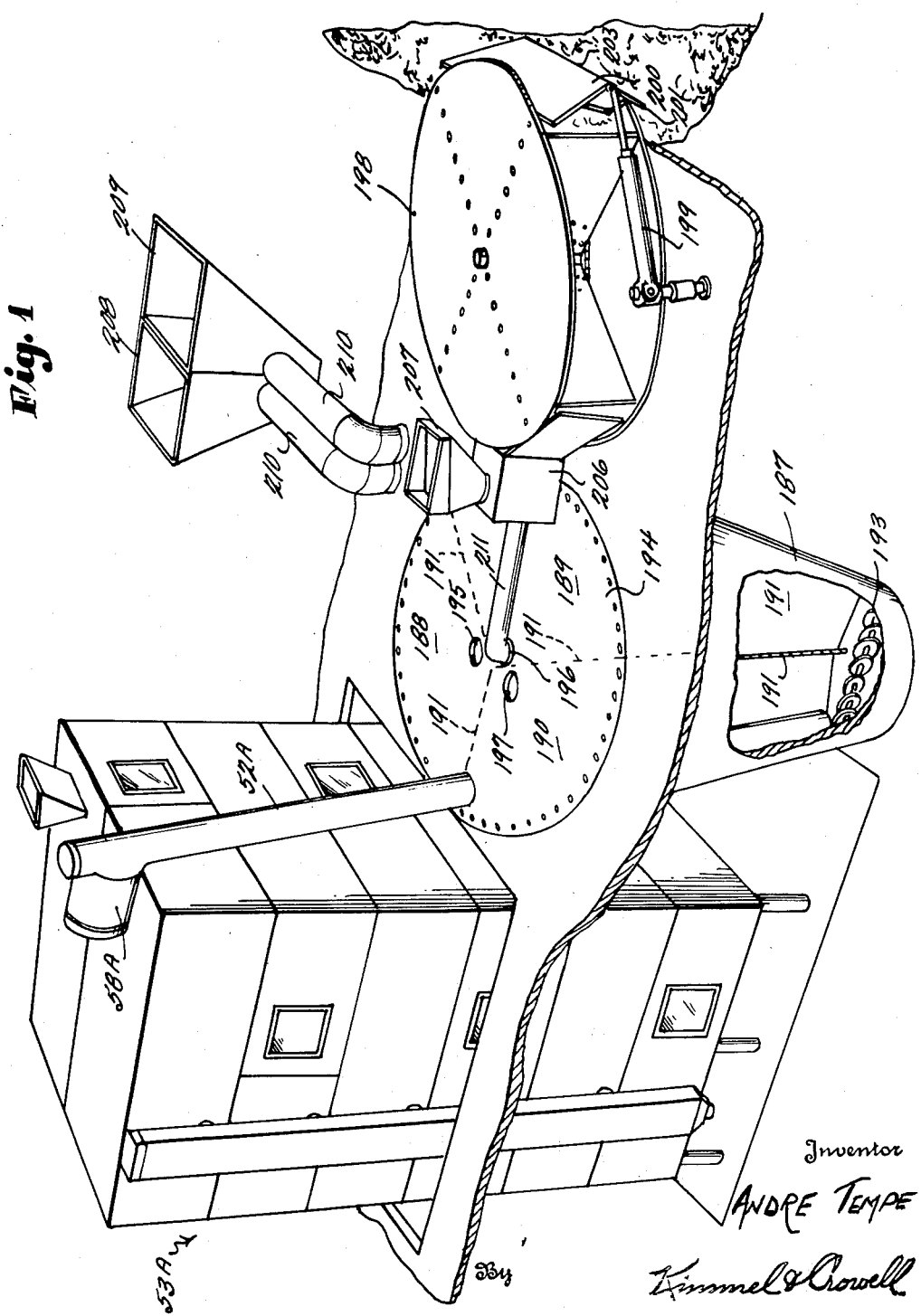

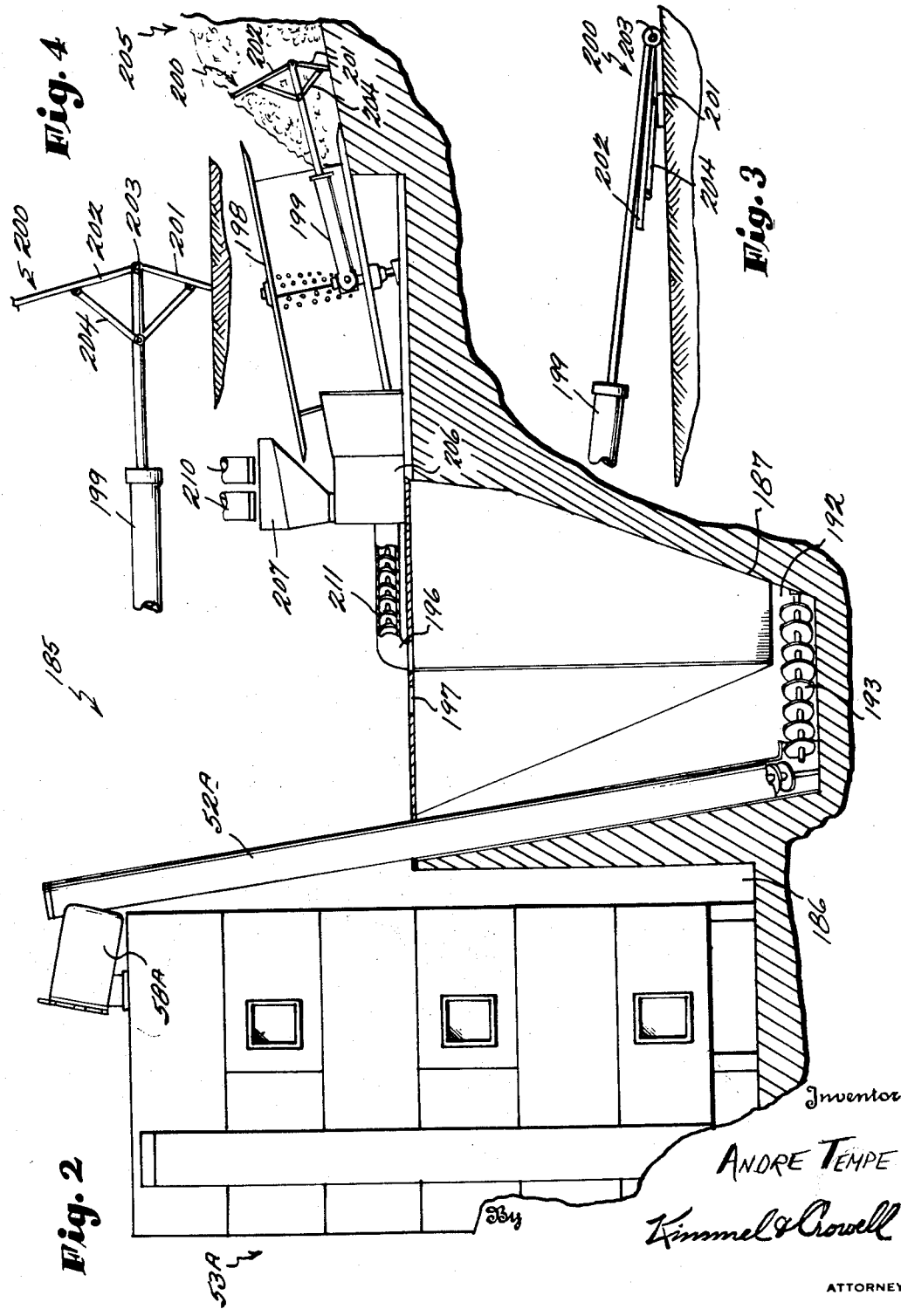

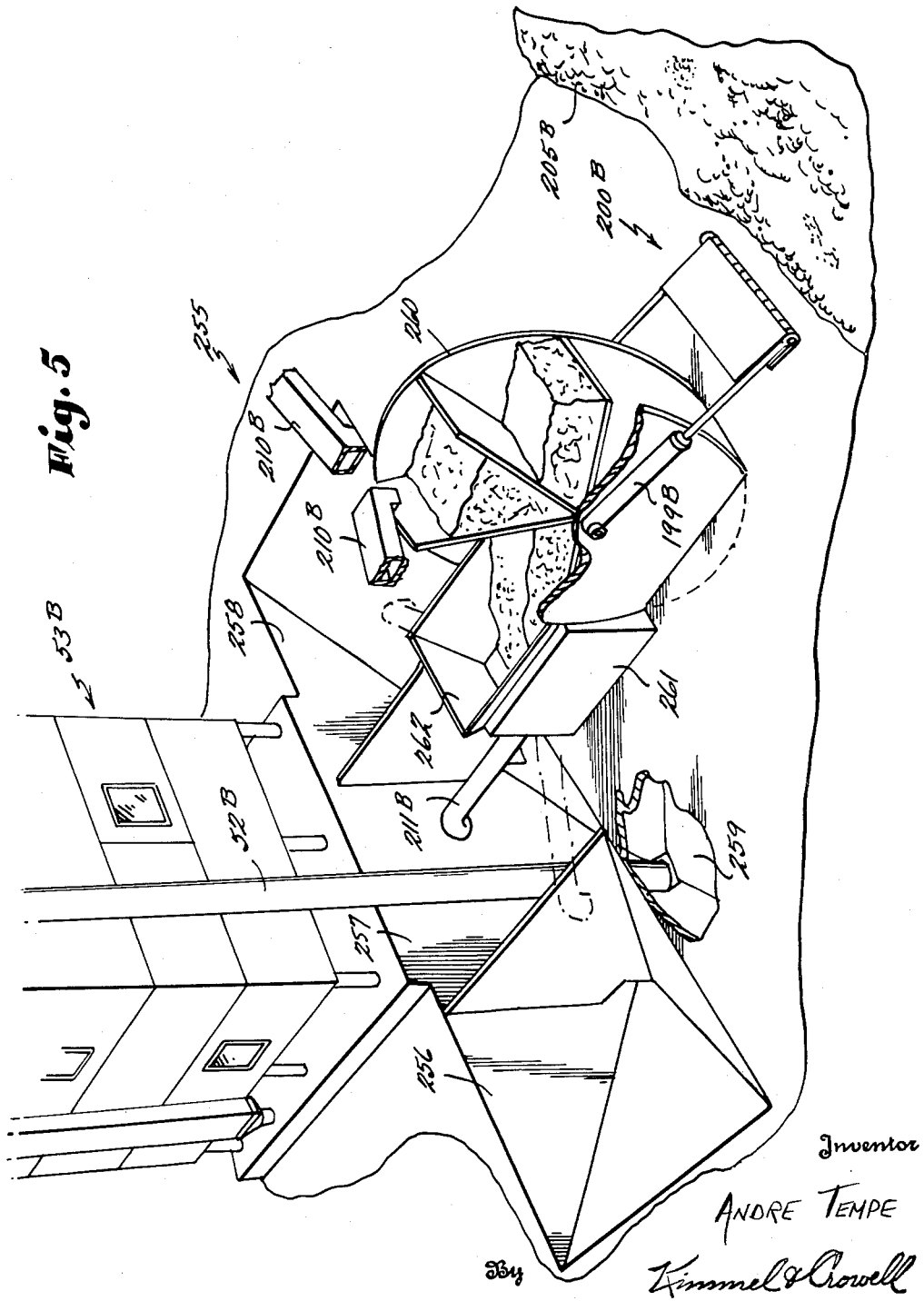

United States Patent Office 3,127,002
Patented Mar. 31, 1964

3,127,002
TRANSFER DEVICE
Andre Tempe, P.O. Box 407, Budd Lake, N.J.
Original application July 6, 1959, Ser. No. 825,145, now Patent No. 3,092,467, dated June 4, 1963. Divided and this application Sept. 14, 1962, Ser. No. 227,975
6 Claims. (Cl. 198—104)

A primary object of the instant invention is to provide a feeding mechanism or transfer device for an apparatus in which digestible waste materials are continuously converted to useful products by following a digestion method such as shown in my Patent No. 3,092,467, the instant case being a divisional application of the same.

Another object of the invetion is to provide an apparatus of the class described above which can be operated on a continuous basis with extremely limited manpower, without decreasing the efficiency of the method.

Other objects and advantages will become apparent in the following specification when considered in light of the attached drawings, in which:

FIGURE 1 is a fragmentary perspective view of one embodiment of transfer device in accordance with this invention for use in conjunction with a digester or the like such as shown in my aforementioned patent;

FIGURE 2 is a side elevation shown partially broken away and in section of the embodiment illustrated in FIGURE 1;

FIGURE 3 is a fragmentary side elevation of the feed mechanism in closed position;

FIGURE 4 is a view similar to FIGURE 3 of the feed mechanism in open position;

FIGURE 5 is a fragmentary perspective view of a modified form of the invention shown partially broken away and in section for convenience of illustration.

Referring now to the drawings and particularly to FIGURES 1 to 4, one form of transfer device in accordance with the instant invention is shown as useful with a digesting apparatus indicated generally at 185.

In the digester apparatus 185, a pit 186 is provided to contain a digester 53A identical to the digester 53 shown in my aforementioned patent. A cylindrical feed chamber 58A is mounted on top of the digester 53A and is fed by a vertical screw conveyor 52A in the same manner as the screw conveyor 52 feeds the chamber 58 in the preferred form of the invention shown in my patent.

A semi-conical pit 187 is positioned adjacent the pit 186 and is divided into three compartments 188, 189 and 190 by a plurality of radially extending vertical partitions 191. A single compartment 192 underlies the compartments 188, 189, 190 and has a horizontal screw conveyor 193 positioned therein. The screw conveyor 193 is arranged to feed material to the lower end of the upright screw conveyor 52A with the material flowing successively from the compartments 188, 189, 190 which are emptied in rotation.

The pit 187 is closed by a circular cover 194 having filling openings 195, 196, 197 formed therein communicating respectively with the compartments 188, 189, 190.

A horizontal compartmented wheel 198 is positioned adjacent the pit 187 and has a pair of spaced parallel hydraulic rams 199 arranged on opposite sides thereof. A folding scraper blade 200 is operatively connected on opposite sides to the rams 199 and is adapted to be horizontally reciprocated thereby.

The scraper blade 200 includes a lower blade section 201 and an upper blade section 202 hingedly secured to the lower blade section 201 along a horizontal juncture line 203. The lower blade section 201 is somewhat shorter than the upper blade section 202 and the blade sections are connected by links 204 to limit the spread of the blade sections 201, 202. The scraper blade 200 is reciprocated by the hydraulic rams 199 so that as the scraper blade 200 is moved away from the wheel 198, the blade sections 201, 202 are collapsed together, as shown in FIGURE 3, to permit the scraper to be forced into a material supply pile 205. The rams 199 are then actuated in the opposite direction, pulling the scraper blade 200 toward the wheel 198, whereupon the plates 201, 202 separate to the position shown in FIGURE 4 and a portion of the material supply pile 205 is pulled into one of the compartments of the wheel 198. The scraper blade 200, when forcing material into a compartment of the wheel 198, squeezes excess moisture from the material. The wheel 198 is then rotated 90 degrees and the action of the scraper blade 200 is repeated to fill the next compartment. When a filled compartment has been rotated 180 degrees from the scraper blade 200, it communicates with a transfer chamber 206 positioned adjacent the pit 187. Material in the compartments of the compartmented wheel 198 is moved into the transfer chamber 206 when in registry therewith.

A hopper 207 is mounted on the top of the transfer chamber 206, as is clearly shown in FIGURES 1 and 2. A pair of supply hoppers 208, 209 are arranged in laterally spaced relation to the hopper 207 and a pair of feed conduits 210 extend respectively therefrom to feed material into the hopper 207. Additives to supply missing components from the material supply pile 205 are contained in the hoppers 208, 209 and are added to the material of the material supply pile 205 in the transfer chamber 206.

A screw conveyor 211 extends from the transfer chamber 206 and communicates with the registering inlet opening 195, 196, or 197 in the cover 194.

As previously stated, the digester 53A is identical to the digester 53 of my aforementioned patent and the transfer device illustrated in FIGURES 1 through 4 provides means for feeding digestible material other than garbage into the digester, while at the same time adding other materials thereto, supplying deficiencies in the material to be processed.

In FIGURE 5 a modified feeding mechanism or transfer device is illustrated generally at 255 for feeding material to a digester, generally indicated at 53B and identical in construction to the digester 53 of my previously mentioned patent. In the feeding mechanism 255 a plurality of hoppers 256, 257, 258 are arranged in laterally aligned relation, feeding into a single hopper 259 underlying each of the hoppers 256, 257, 258. A screw conveyor 52B extends from the hopper 259 to the top of the digester 53B to convey material therefrom into the digester 53B. An upright compartmented wheel 260 is mounted for rotation adjacent a transfer chamber 261 having a hopper top 262 formed thereon. A pair of hydraulic rams 199B, identical to the hydraulic rams 199 of the previously described embodiment, are positioned on opposite sides of the compartmented wheel 260 and have a scraper blade, generally indicated at 200B, connected thereto for operation in the identical manner of the scraper blade 200, likewise of the previously described embodiment. The scraper blade 200B moves the waste material from the pile 205B into the compartments of the wheel 260; rotation of the wheel 260 aligns the compartments thereof with the hopper 262 so that the material flows into the hopper and then into the transfer chamber 261.

Conduits 210B extend from additive material hoppers (not shown) so that additives may be supplied to the waste material 205B when found to be lacking in the essential requirements. A screw conveyor 211B extends from the transfer chamber 261 and can be swung to discharge material into a selected one of the hoppers 256, 257 or 258. The waste material 205B fed into the hoppers 256, 257, 258 is successively fed therefrom by the screw conveyor 52B so that the initial stages of digestion may begin to take place in the hoppers 256, 257, 258 before the material is moved into the top tank of the digester 53B.

It should be understood that the feeding mechanism 255, illustrated in FIGURES 1 to 5 may be used with any digesters or similar structures where it is desired to transfer thereto material such as waste or the like from a pile of the same.

Having thus described the preferred embodiments of the instant transfer device, it should be understood that numerous additional modifications may be resorted to without departing from the scope of the appended claims.

What is claimed is:

1. A feed mechanism for digesters comprising a plurality of adjacent hoppers, a transfer chamber positioned adjacent said hoppers, a conveyor extending from said transfer chamber toward said hoppers for successively filling said hoppers, a compartmented wheel positioned adjacent said transfer chamber and adapted to discharge the contents of each compartment into said transfer chamber upon rotation of said wheel, and a scraper blade mounted for reciprocation adjacent said wheel for filling the compartments of said wheel.

2. A device as claimed in claim 1 wherein said compartmented wheel is mounted on a horizontal axis and said scraper blade is reciprocated by hydraulic means positioned adjacent said wheel.

3. A device as claimed in claim 1 wherein said wheel is mounted on a generally upright axis and said scraper blade is actuated by a pair of spaced apart hydraulic rams positioned on opposed sides of said wheel.

4. A device as claimed in claim 1 wherein said hoppers have a common bottom, an additional conveyor extending from said common bottom of said hoppers to said digester to move the material from said hoppers to said digester.

5. A device in accordance with claim 1 wherein said scraper blade comprises an upper blade section, a lower blade section, hinge means pivotally securing said blade sections to each other along a juncture line, and means operatively secured to opposite ends of said juncture line to reciprocate said scraper blade for filling the compartments of said wheel.

6. A device in accordance with claim 5 further including linkage means limiting the spread of said blade sections with respect to each other.

No references cited.